US011293799B2

(12) United States Patent
Kiesel et al.

(10) Patent No.: US 11,293,799 B2
(45) Date of Patent: Apr. 5, 2022

(54) CHROMATIC CONFOCAL SENSOR

(71) Applicant: Palo Alto Research Center Incorporated, Palo Alto, CA (US)

(72) Inventors: Peter Kiesel, Palo Alto, CA (US); Philipp Schmaelzle, Mountain View, CA (US); Konrad Bellmann, Berlin (DE); Markus Beck, Radolfzell am Bodensee (DE)

(73) Assignee: Palo Alto Research Center Incorporated, Palo Alto, CA (US)

( * ) Notice: Subject to any disclaimer, the term of this patent is extended or adjusted under 35 U.S.C. 154(b) by 144 days.

(21) Appl. No.: 16/730,333

(22) Filed: Dec. 30, 2019

(65) Prior Publication Data
US 2021/0199496 A1 Jul. 1, 2021

(51) Int. Cl.
| | | |
|---|---|---|
| *G01J 1/04* | (2006.01) | |
| *G01B 11/14* | (2006.01) | |
| *G01H 9/00* | (2006.01) | |
| *G02B 6/42* | (2006.01) | |
| *G02B 3/00* | (2006.01) | |
| *G01L 1/24* | (2006.01) | |

(52) U.S. Cl.
CPC ............ *G01J 1/0488* (2013.01); *G01B 11/14* (2013.01); *G01H 9/00* (2013.01); *G01J 1/0411* (2013.01); *G01L 1/24* (2013.01); *G02B 3/0087* (2013.01); *G02B 6/4202* (2013.01); *G02B 6/4206* (2013.01)

(58) Field of Classification Search
CPC ..... G01J 1/0488; G01J 1/0411; G02B 6/4206; G02B 6/4202; G02B 3/0087; G01H 9/00; G01B 11/14
See application file for complete search history.

(56) References Cited

U.S. PATENT DOCUMENTS

| | | | | |
|---|---|---|---|---|
| 4,393,348 | A * | 7/1983 | Goldstein | .......... G01R 31/2656 136/290 |
| 7,310,153 | B2 | 12/2007 | Kiesel et al. | |
| 7,599,068 | B2 * | 10/2009 | Lehmann | ........... G01B 11/2441 356/489 |
| 10,260,941 | B2 | 4/2019 | Marsaut et al. | |
| 2016/0299327 | A1 * | 10/2016 | Grabber | ............... G02B 3/0056 |
| 2019/0186903 | A1 | 6/2019 | Frank | |
| 2019/0353479 | A1 | 11/2019 | Mies | |

* cited by examiner

*Primary Examiner* — Que Tan Le
*Assistant Examiner* — Don J Williams
(74) *Attorney, Agent, or Firm* — Mueting Raasch Group

(57) ABSTRACT

A sensing device includes an aperture structure having an aperture and imaging optics configured to direct polychromatic light toward the aperture. The imaging optics separates the light according to spectral range longitudinally along a first axis The aperture substantially transmits a spectral range of the light and substantially blocks other spectral ranges of the light. An optical detector is arranged to receive the spectral range of the light that is transmitted through the aperture. The optical detector generate an electrical output that corresponds to a centroid of the spectral range of the light.

20 Claims, 11 Drawing Sheets

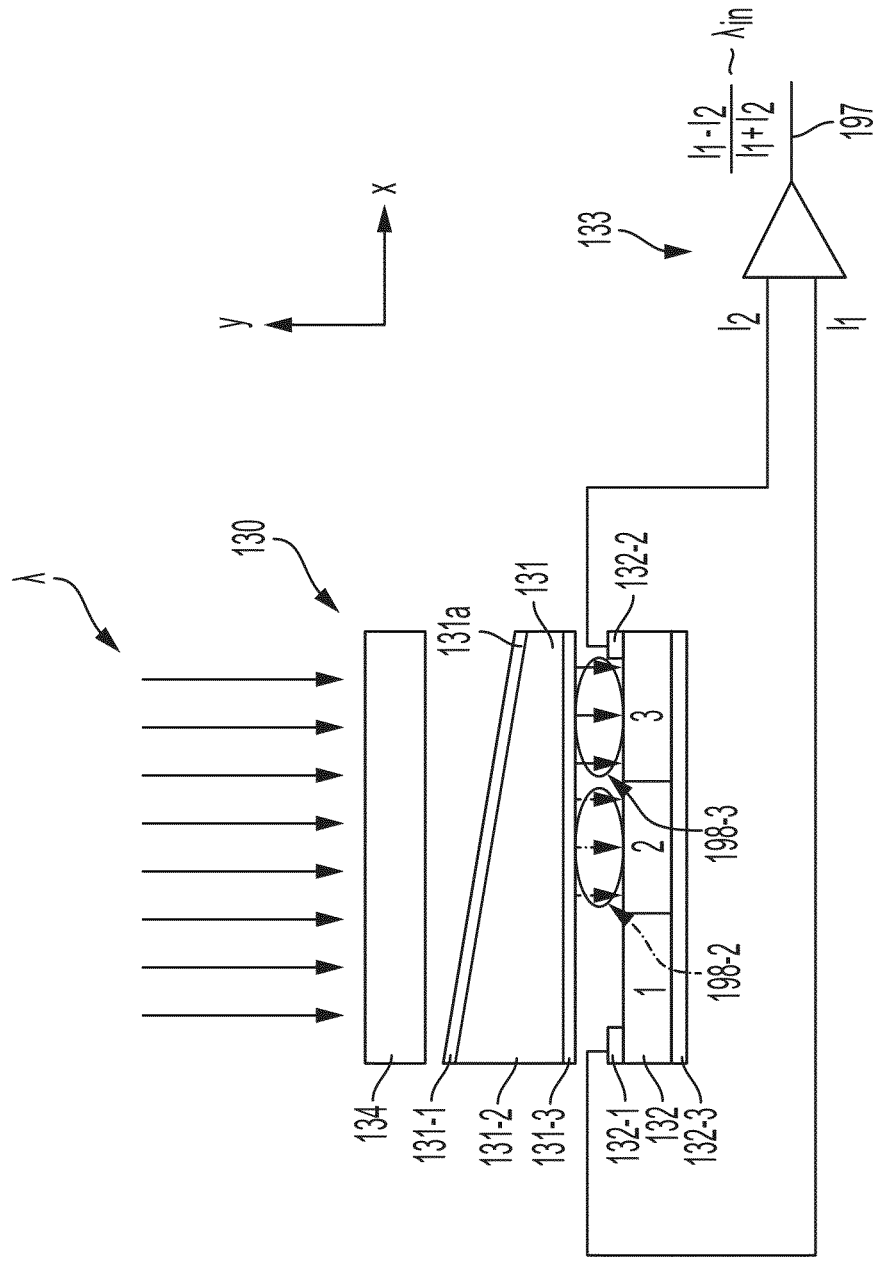

CHROMATIC CONFOCAL SENSOR

BACKGROUND

Chromatic confocal sensing relies on polychromatic light that passes through one or more lenses that have a high degree of chromatic aberration. Each spectral range of the polychromatic light focuses at a different distance along an axis. The focused spectral range passes through an aperture and is measured. The measured spectral range corresponds to position along the axis. Chromatic confocal sensors are used in applications such as profilometry and metrology and have also been implemented to measure thicknesses of transparent objects among numerous other applications.

BRIEF SUMMARY

Some embodiments involve an optical device. The device includes an aperture structure having an aperture and imaging optics configured to direct polychromatic light toward the aperture. The imaging optics separates the light according to spectral range longitudinally along a first axis The aperture substantially transmits a spectral range of the light and substantially blocks other spectral ranges of the light. An optical detector is arranged to receive the spectral range of the light that is transmitted through the aperture. The optical detector generate an electrical output that corresponds to a centroid of the spectral range of the light.

Some embodiments are directed to a sensing method. Polychromatic light is separated according into a plurality of spectral ranges longitudinally along a first axis. A spectral range of the light is transmitted through an aperture while other spectral ranges are blocked. An electrical output that corresponds to a centroid of the spectral range of light transmitted through the aperture is generated.

BRIEF DESCRIPTION OF DRAWINGS

FIG. 1B illustrates an example of a wavelength shift detector in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

There is interest in developing novel sensor systems for structural health monitoring, health care service, industrial process monitoring, and environmental monitoring. Typical measurements include temperature, strain and vibration sensing. Optical sensors allow remote and distributed sensing, can be used in harsh environments, and are immune to electromagnetic interferences.

Embodiments described herein are directed to various types of devices that combine chromatic confocal optics with a wavelength shift detector (WSD) that is capable of determining the centroid of light received by the WSD. In some embodiments, the WSD can resolve sub pm wavelength changes with a bandwidths of a few kHz. In some implementations the WSD includes photo sensor array or position detector element, coated with an optical linear variable filter, which converts the wavelength information of the incident light into a spatial intensity distribution on the detector. Differential read-out of the position detector is used to determine the centroid of this distribution. In some embodiments, the position detector is a split photodiode array comprising two photodiodes. A wavelength change of the incident light is detected as a shift of the centroid of the distribution.

Figure 1A:
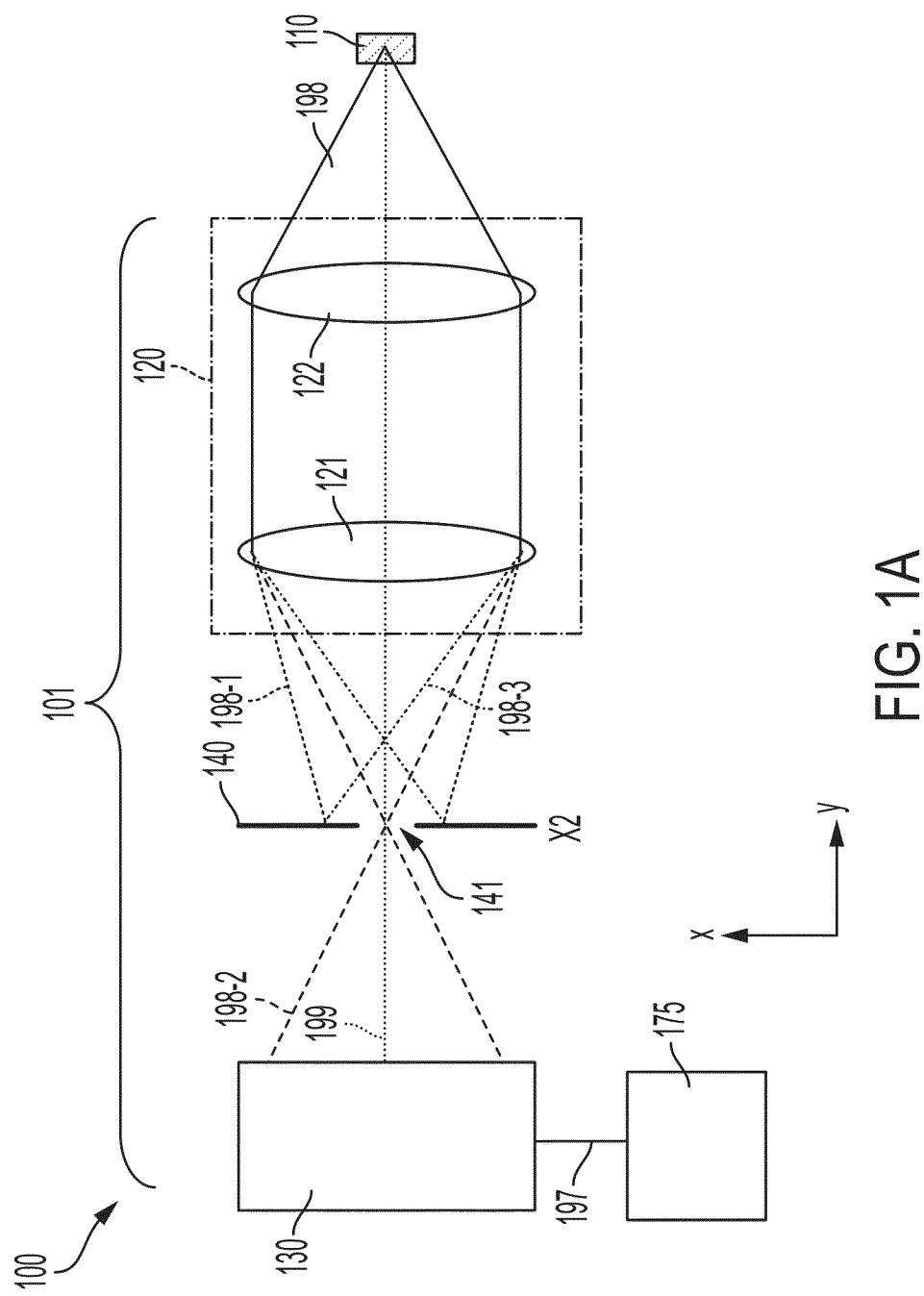
FIG. 1A is a diagram of a sensing system in accordance with some embodiments.

FIG. 1A is a diagram of a sensing system 100 in accordance with some embodiments. The system 100 includes a sensing device 101 that can provide an electrical output 197 to a processor 175. The electrical output 197 includes information about parameters such as distance, thickness, movement, vibration, etc., and the processor 175 is capable of extracting and formatting the information.

The system 100 includes a light source 110 that generates polychromatic measurement light 198. The device 101 includes an aperture 141 that receives and transmits at least one spectral range of the polychromatic light while other spectral ranges are substantially blocked. The aperture 141 may be any small opening that can transmit light. FIG. 1 shows the aperture 141 in an aperture plate 140. The sensing device 101 also includes chromatic confocal imaging optics 120 that are shown in FIG. 1 as first and second lenses 121, 122, arranged along the longitudinal axis 199, however the chromatic confocal imaging optics could have a number of different arrangements. The imaging optics 120 has a substantial chromatic aberration with respect to a longitudinal axis 199. In FIG. 1 the longitudinal axis lies along the y axis as indicated.

After passing through the imaging optics 120, the polychromatic light 198 is separated into spectral ranges 198-1, 198-2, 198-3 along the longitudinal axis 199. In this embodiment, only the spectral range that is focused at the aperture 141 (198-2 in FIG. 1A) passes through the aperture 141 to the wavelength shift detector (WSD) 130 without loss. In FIG. 1A, spectral ranges, 198-1, 198-3 are not substantially transmitted through the aperture 141 such that these spectral ranges do not contribute significantly to the light that is analyzed by the WSD 130.

An example WSD 130 is shown in more detail in FIG. 1B. The spectral range of light having wavelength centroid $\lambda_{in}$ is transmitted through the aperture and is received by the WSD 130. The WSD 130 is configured to generate an output that indicates the wavelength centroid of the spectral range of the light received by the WSD 130.

According to some embodiments, the WSD 130 includes an optical filter 131 arranged to receive light transmitted through the aperture 141. The optical filter 131 has a laterally varying transmission characteristic with respect to wavelength along a second (lateral) axis perpendicular to the first (longitudinal) axis. In the arrangement shown in FIGS. 1A and 1B, the y axis is the longitudinal axis and the x axis is the lateral axis.

According to some implementations, the optical filter 131 with laterally varying transmission properties may be a variable thickness etalon, which includes at least three sub-components, a wedge-shaped transmissive cavity 131-2 and two reflective films 131-1 and 131-3. Therefore, the three films 131-1, 131-2, 131-3 form a wedge-shaped Fabry-Perot etalon. The wedge-shaped transmissive cavity 131-2 has a thickness, d, which varies as a function of the distance x along the lateral dimension of the wedge. Therefore, the wedge-shaped etalon 131 will transmit different spectral ranges as a function of lateral distance x.

The optical filter 131 having laterally varying transmission properties shown in FIG. 1A may be disposed adjacent to a position-sensitive detector 132. In some embodiments, the optical filter 131 may be disposed between the position-sensitive detector 132 and an optional light spreading component 134 that serves to spread the input light over the receiving surface 131a of the optical filter 131.

As shown in FIGS. 1A and 1B, when the aperture 141 is at a first position X1 with respect to the imaging optics 120, the light 198-2 (having wavelength centroid $\lambda_2$) is transmitted through the aperture 141 to the WSD 130. Due to the laterally varying transmission properties of the filter 131, when the light 198-2 transmitted through the optical filter 131, the light 198-2 emerges from the filter 131 an impinges on a location #2 of the position sensitive detector 132. Therefore, the position-sensitive detector 132 generates currents $I_1$ and $I_2$ that correspond to the illumination of location 2.

Figure 1C:
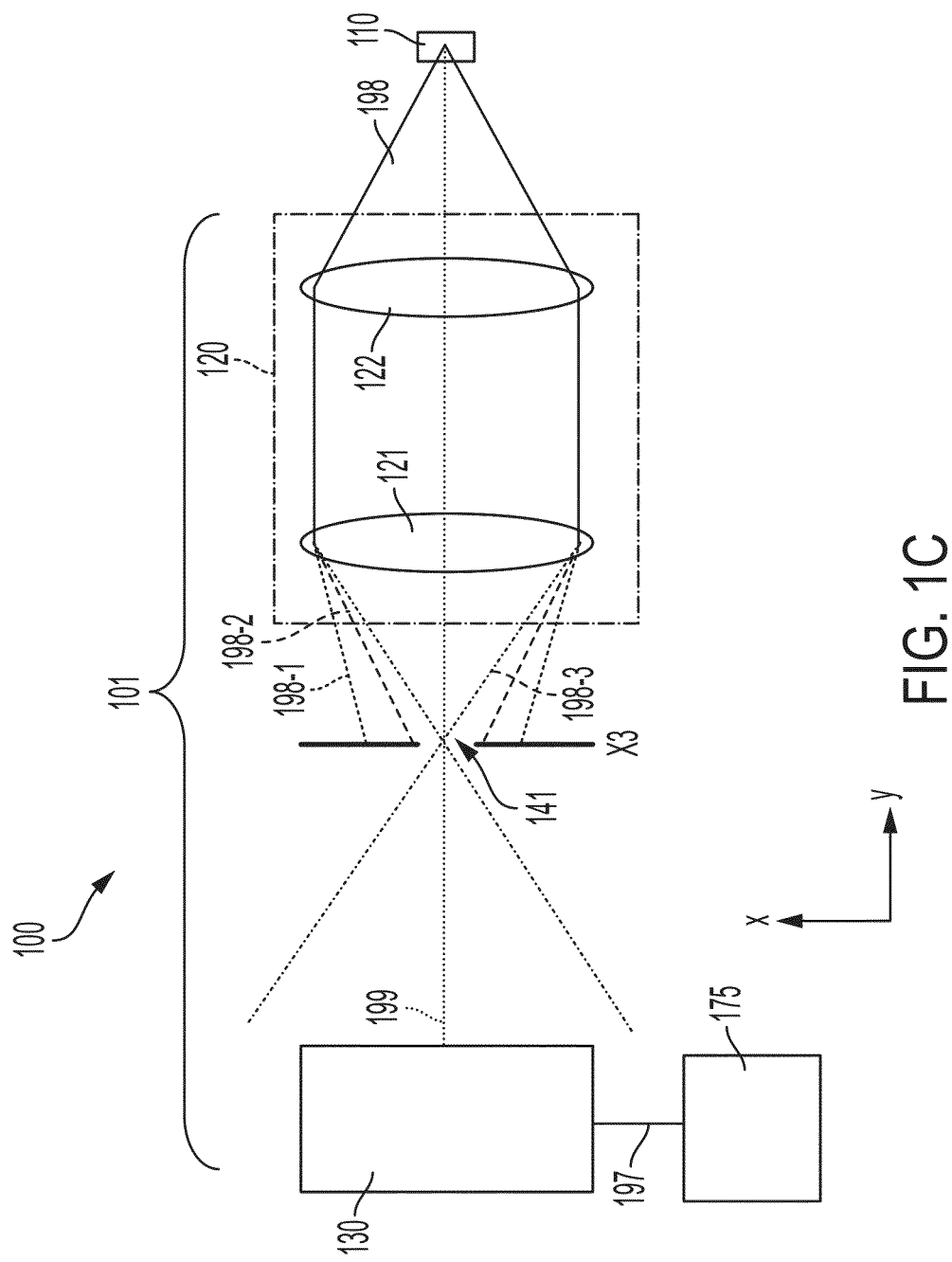
FIG. 1C is a diagram of a sensing system in accordance with some embodiments.

As shown in FIGS. 1C and 1B, when the aperture 141 is at a second position X2 with respect to the imaging optics 120, the light 198-3 (having wavelength centroid $\lambda_3 \neq \lambda_2$) is transmitted through the aperture 141 to the WSD 130. Due to the laterally varying transmission properties of the filter 131, when the light 198-3 transmitted through the optical filter 131, the light 198-3 emerges from the filter 131 an impinges on a location #3 of the position sensitive detector 132. Therefor position sensitive detector 132 generates currents $I_1$ and $I_2$ that correspond to the illumination of location 3.

The WSD 130 includes circuitry 133 configured to provide an output 197 that includes information about the centroid of the spectral range of the light received by the WSD. In some embodiments, the optical filter 131 may be fabricated directly on the position sensitive detector 132 along with electronic circuitry 133 as an integrated optoelectronic circuit. The circuitry 133 provides a differential output signal 197 that indicates the wavelength centroid of the spectral range received by the WSD. The differential output signal can be defined as:

$$I_{diff} = I_1 - I_2 / I_1 + I_2,$$

where the $I_{diff}$ corresponds to the wavelength centroid, $\lambda_{in}$, of the input spectral range.

Figure 2:
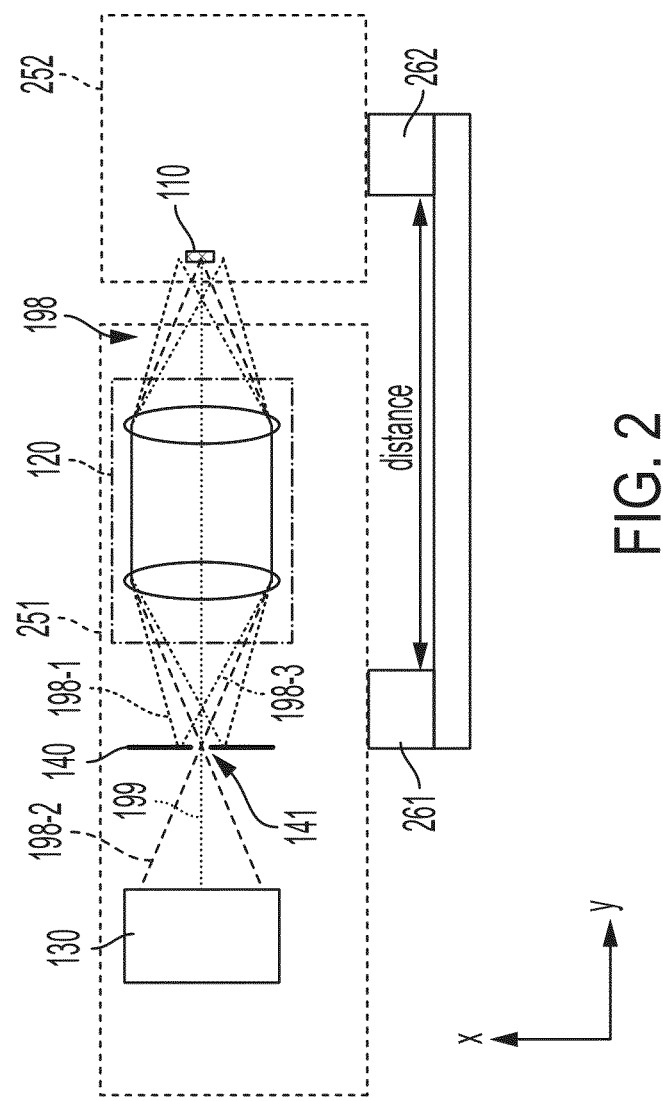
FIG. 2 illustrates a distance or vibration sensor in accordance with some embodiments.

The chromatic confocal sensor discussed herein is particularly useful to measure the distance between two structural components 261, 262 as illustrated in FIG. 2. In FIG. 2, the imaging optics 120, aperture 141, and WSD 130 are arranged in a fixed relationship with one another and may be mounted to a housing or other type of support 251. The polychromatic light source 110 may be mounted to a separate housing or support 252. Support 251 is rigidly attached to a first structural component 261 and support 252 is rigidly attached to a second structural component 262. As the distance between structural components 261 and 262 changes, the spectral ranges of light 198-1, 198-2, 198-3 transmitted through the aperture 141 and encountering the WSD 130 will change accordingly. The WSD 130 produces an output 197 that corresponds to the spectral range transmitted through the aperture 141. A processor 175 can determine the distance along the y axis between the structural components 261 and 262 based on the output 197. In a related implementation, the parameter measured may be vibration which is manifested as a changing distance between the structural components 261, 262.

Figure 3:
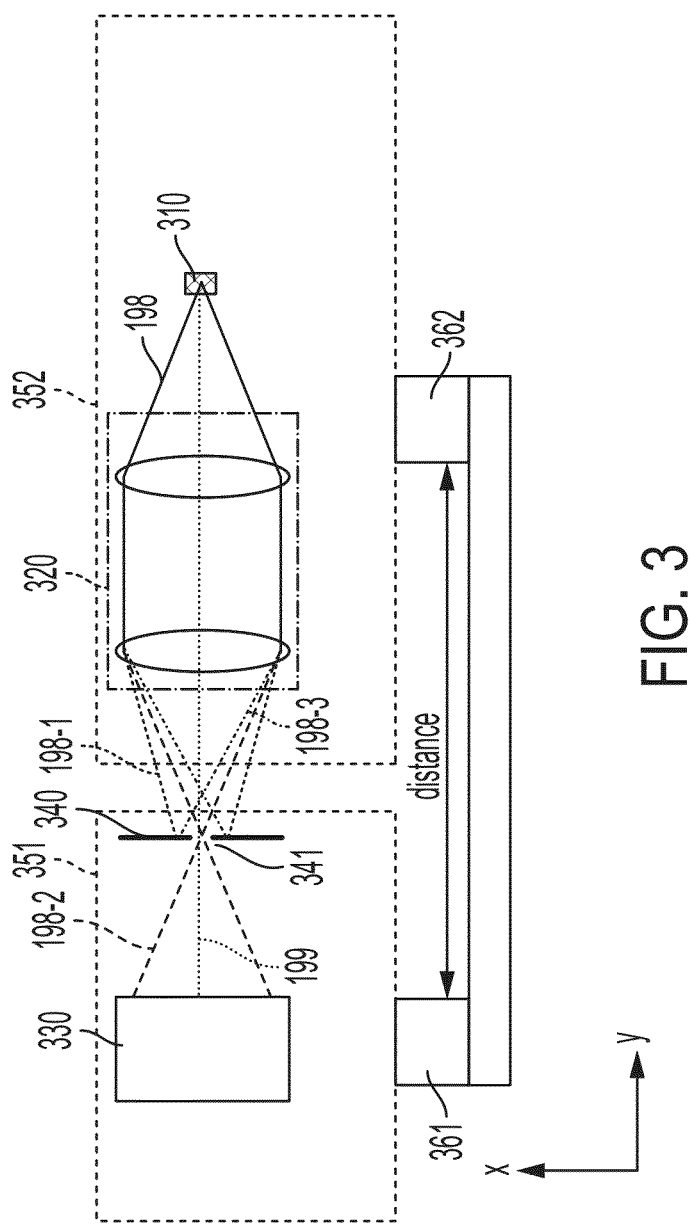
FIG. 3 illustrates a distance or vibration sensor in accordance with some embodiments.

FIG. 3 illustrates another implementation for measuring distance. As depicted in FIG. 3, the light source 110 and imaging optics 120 are arranged in a fixed relationship with one another and may be mounted to a housing or other type of support 352. The aperture 141 and WSD 130 are arranged in a fixed relationship with one another and may be mounted to a separate housing or other type of support 351. Support 351 is rigidly attached to a first structural component 361 and support 352 is rigidly attached to a second structural component 362. As the distance between structural components 361 and 362 changes, the spectral range of light 198-1, 198-2, 198-3 transmitted through the aperture 141 and encountering the WSD 130 will change accordingly. The WSD 130 produces an output 197 that corresponds to the spectral range transmitted through the aperture 141. A processor 175 can determine the distance along the y axis between the structural components 361 and 362 based on the electrical output 197 from the WSD 130. In a related implementation, the parameter measured may be vibration which is manifested as a changing distance between the structural components 361, 362.

The detection of vibrations can be realized by relative distance measurements between structural components. Vibrations with amplitude of 1 micro strain require distance accuracy of $10^{-6}$, e.g., distance resolution of 10 nm between points 10 mm apart Chromatic confocal sensors allow for distance changes of a few nm which would allow for sub micro-strain resolution for vibration sensors.

Many different sensing schemes possible with the approaches described herein. As illustrated in FIGS. 2 and 3 above, implementations with either the WSD in the confocal imaging plane (FIG. 3) or the point like polychromatic light source in the confocal imaging plane (FIG. 2) are particularly useful.

The light source 110 in FIGS. 2 and 3 may be a compact point-like polychromatic light source. The imaging optics 120 may comprise a chromatic lens, GRIN lens, SELFOC lens). The aperture 141 may be tunable. The WSD may be a chip-size detector.

Depending on the distance between the two dashed boxes (251, 252 in FIG. 2; 351, 352 in FIG. 3) a different spectral subrange of the polychromatic light gets detected by the WSD 120. Wavelength range, resolution, and operation bandwidth of the WSD 130 can be tailored for a specific application by a suitable combination of the position-dependent optical coating, detector, and light source.

Figure 4:
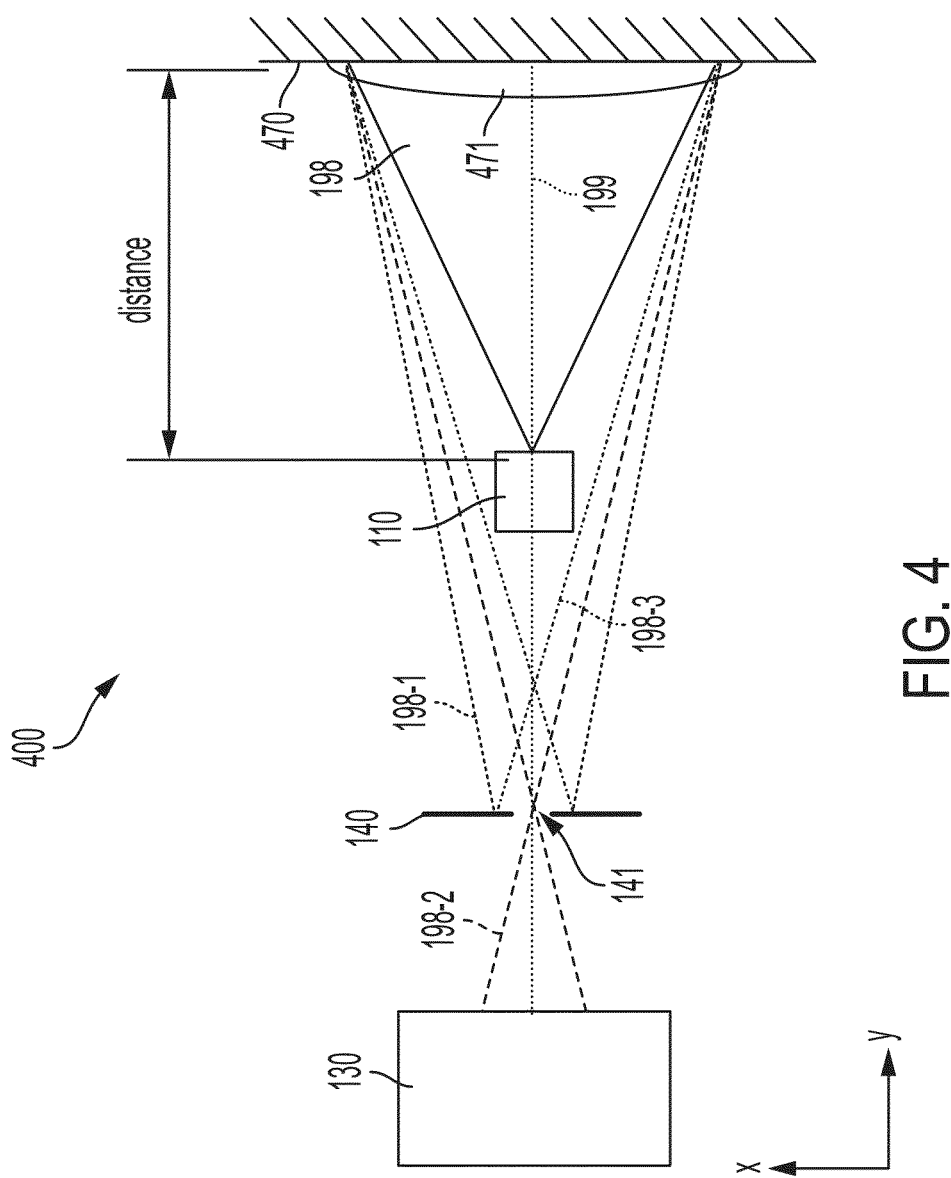
FIG. 4 provides a configuration of a distance or vibration sensor in accordance with some embodiments.

Approaches discussed herein provide a compact, fast and contactless distance sensor. As shown in FIG. 4 a chromatic confocal sensor in accordance with some embodiments can be used to monitor rotating objects like camshafts or turbines. Depending on the rotation angle a different spectral range reflected by the object reaches the WSD which is able to detect pm wavelength in the 10 kHz range even if the incoming light intensity only a few µW. Detection of low intensity input light is important for this type of sensor since the object under test may only reflect a small amount of the light and in general the precision of this distance sensor can be increased by narrowing the aperture in front of the WSD.

FIG. 4 depicts and embodiment comprising a folded chromatic confocal sensor 500 having a back-folded sensor path. The sensor 400 can be arranged to measure distance or vibration. As depicted in FIG. 4, the light source 110, WSD 130, and aperture 141 are arranged in a fixed relationship with one another and may be mounted to a housing or other type of support. The lens 471 that has significant chromatic aberration is mounted to a reflective portion of a structural component 470. The chromatic aberration of the lens 471 causes the polychromatic light 198 from the source 110 to spatially separate into spectral ranges 198-1, 198-2, 198-3 along the y axis. As the distance between structural component 470 and the light source 110 changes, the spectral range of light 198-1, 198-2, 198-3 transmitted through the aperture 141 and encountering the WSD 130 will change accordingly. The WSD 130 produces an output 197 that corresponds to the spectral range transmitted through the aperture 141. A processor 175 can determine the change in position along the y axis of the structural component 470 based on the electrical output 197 from the WSD 130. In a related implementation, the parameter measured may be vibration which is manifested as a changing position of the structural component 470.

Figure 5:
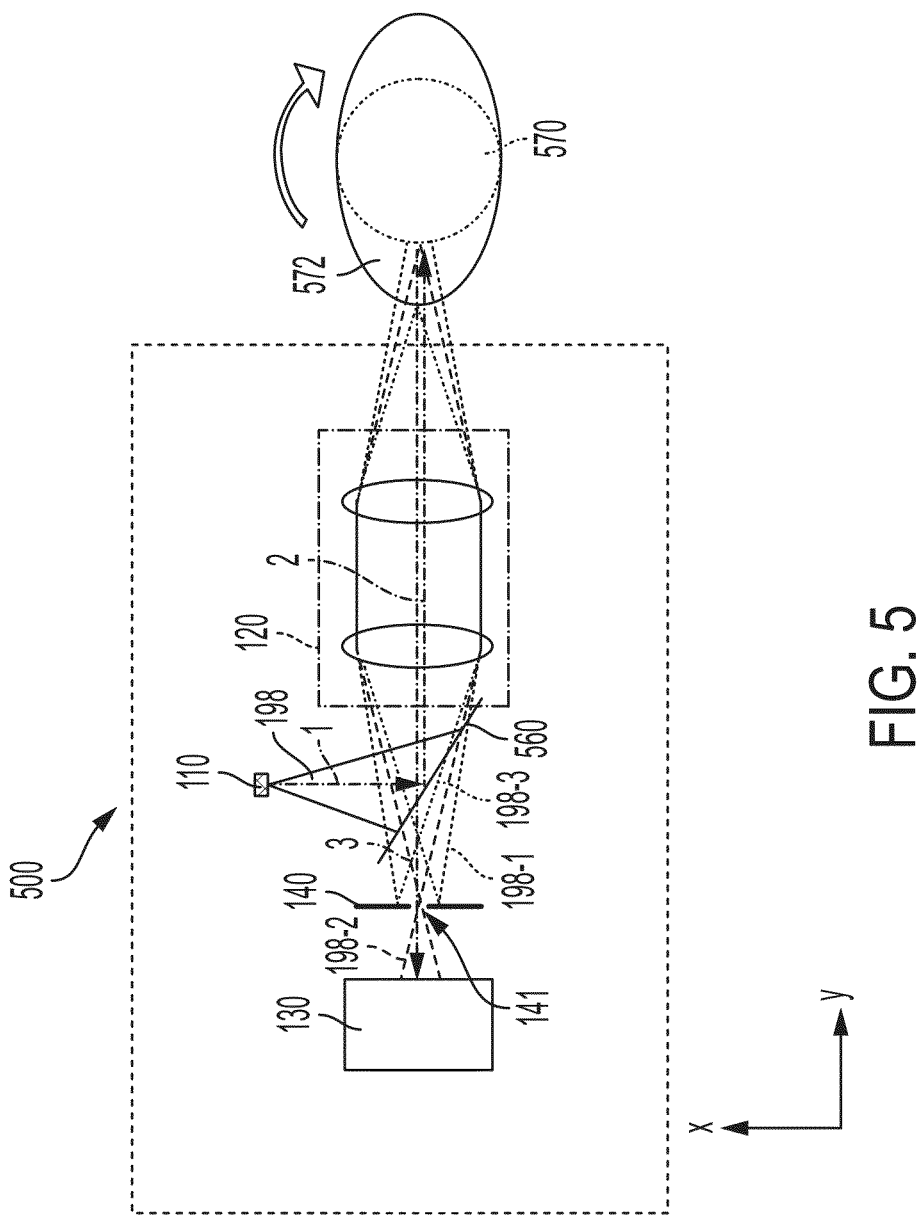
FIG. 5 depicts a sensor that detects rotational motion in accordance with some embodiments.

FIG. 5 is a diagram of a rotation sensor 500 in accordance with some embodiments. The rotation sensor 500 includes a beamsplitter 560 to combine the illumination and detection path. Polychromatic light 198 is emitted along path 1 by light source 110 is redirected by the beamsplitter along path 2 through imaging optics 120 and toward a rotating object 570. The imaging optics 120 has a significant chromatic aberration such that the polychromatic light 198 is spatially separated into spectral ranges 198-1, 198-2, 198-3 along the y axis. The rotating object 570 includes periodic index features 572, e.g., protrusions or indentations. The rotation of the object creates reflective surface that moves back and forth along the y-axis. The spectral range detected by the WSD 130 depends on the distance between the point of redirection of the beamsplitter 560 such that the periodic index features 571 can be detected based on the spectral range of light reflected by the rotating object 570 along path 3. The spectral range reflected along path 3 is transmitted through the beamsplitter 560, through the aperture 141, and to the WSD 130. The WSD 130 generates an electrical signal that corresponds to the spectral range received by the WSD 130. Additional processing circuitry (not shown in FIG. 4 but depicted in FIG. 1A) may be used to determine the characteristics of the rotation, e.g., angular velocity and/or position of the rotating object 570.

Figure 6:
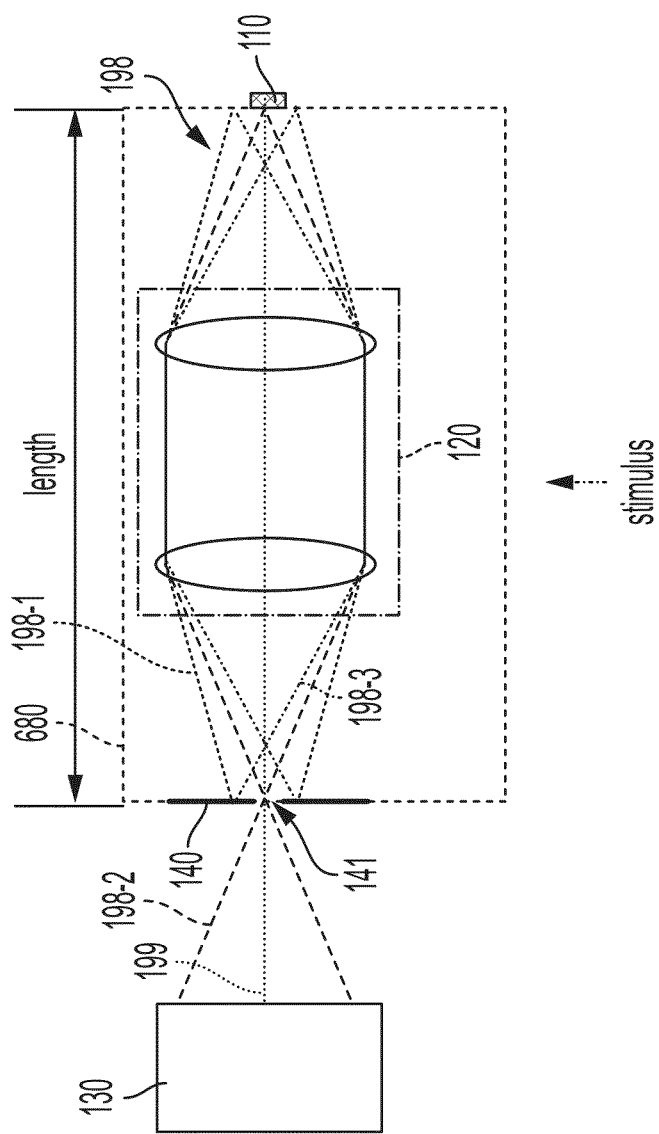
FIG. 6 is a diagram of a strain sensor in accordance with some embodiments.
Figure 7:
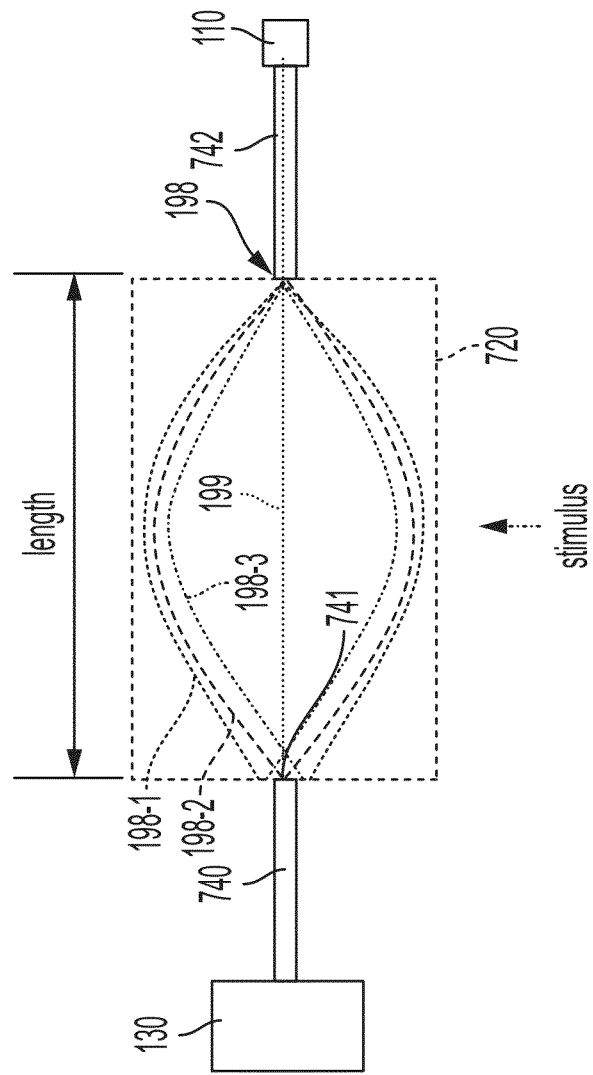
FIG. 7 is a diagram of a strain sensor based on a graded index lens in accordance with some embodiments.

For many applications it is desirable when the whole sensor is composed of a single piece. FIGS. 6 and 7 show embodiments of sensors in which the chromatic confocal imaging optics itself serves as sensor transducer. In these embodiments the imaging optics gets deformed by an external stimulus, such as strain or temperature.

FIG. 6 depicts a chromatic confocal sensor 600 comprising imaging optics 120 and aperture 141 arranged in a unitary piece 680 that can be deformed by a stimulus. The presence of the stimulus changes the length of the unitary piece 680. The changing length results in different spectral subranges of the polychromatic light being detected by the WSD 130. The spectral subrange detected by the WSD 130 can be correlated to the presence and/or amount of the stimulus that changes the length of the unitary piece 680.

FIG. 7 depicts a chromatic confocal sensor 700 wherein the imaging optics are implemented by a graded index (GRIN) lens 720. The GRIN lens 720 is formed as a unitary piece that is attached between a first 740 and second 742 optical waveguides which may be optical fibers. The input face of the first optical fiber 740 serves as the aperture 741 of the sensor 400. The first optical fiber 740 extends between the GRIN lens and the WSD 130. The second optical fiber 742 extends between the GRIN lens 720 and the polychromatic light source 110. Polychromatic light 198 is transmitted via the optical fiber 742 to the GRIN lens 620. The GRIN lens 720 causes spatial separation the spectral ranges 198-1, 198-2, 198-3 of the polychromatic light 198 along the longitudinal axis 199. The length of the GRIN lens 720 determines the spectral range 198-1, 198-2, 198-3 that is transmitted through the aperture 641 to the WSD 130. The spectral subrange detected by the WSD 130 can be correlated to the presence and/or amount of a stimulus that changes the length of the unitary GRIN lens 720.

Figure 8:
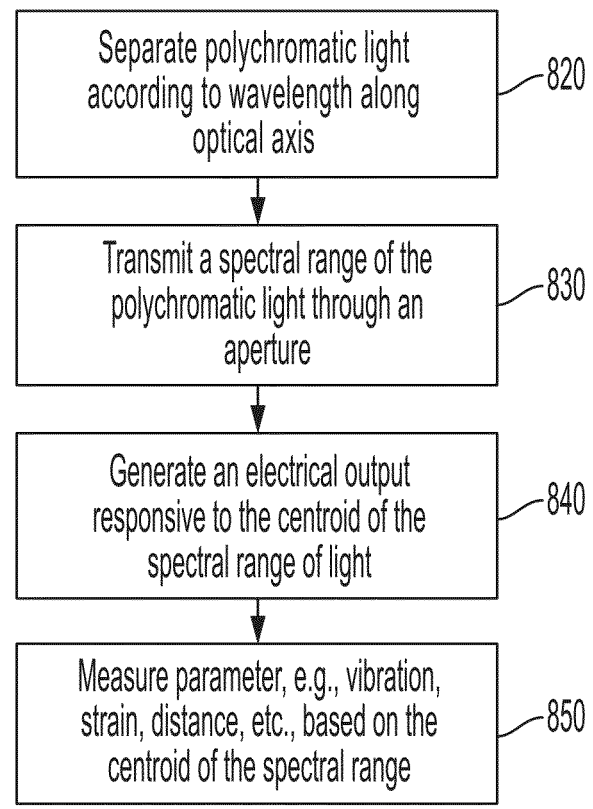
FIG. 8 is a flow diagram illustrating the operation of a chromatic confocal sensor in accordance with some embodiments.

FIG. 8 is a flow diagram of a sensing process in accordance with some embodiments. The method includes separating 820 polychromatic light according to spectral range longitudinally along a first axis. A spectral range of the polychromatic light is transmitted 830 through an aperture. An electrical output is generated 840 that corresponds to the centroid of the spectral range. Information included in the electrical output can be extracted and used to measure 850 a parameter of interest, e.g., distance, vibration, etc.

Figure 9:
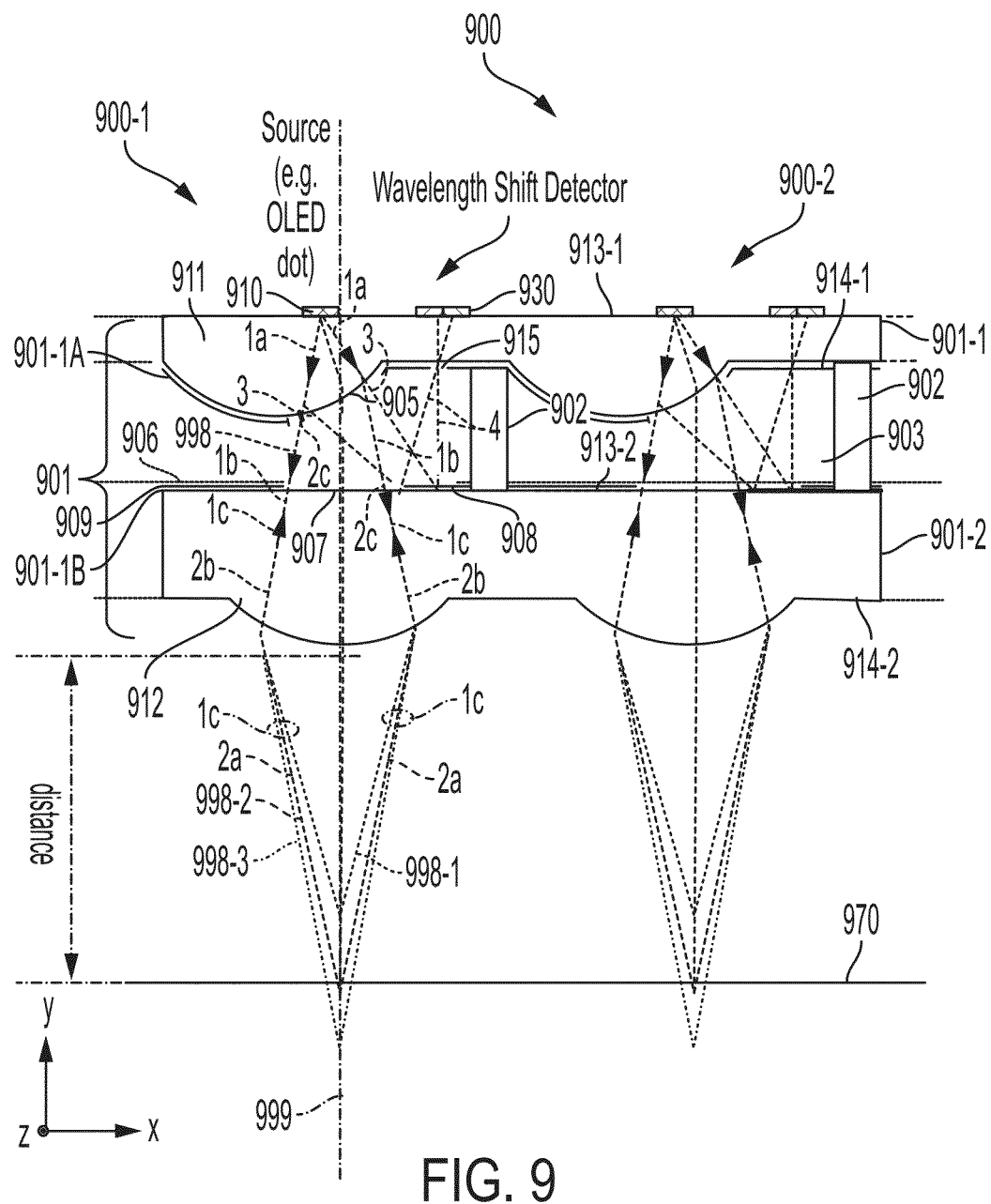
FIG. 9 is a side cross sectional view of an integrated optoelectronic device comprising a chromatic confocal sensor in accordance with some embodiments.

FIG. 9 shows an implementation of the disclosed chromatic confocal sensor 900-1 which is part of an integrated optoelectronic device 900 shown in FIG. 9 as including two chromatic confocal sensors 900-1, 900-2.

Device 900 comprises a film 901 comprising two lenslet layers 901-1, 901-2. Lenslet layer 901-1 includes an array of lenslets 911 and lenslet layer 901-2 includes an array of lenslets 912. The arrays of lenslets 911, 912 may extend along the x axis (1-D arrays) as shown or may extend along the x and z axes (2-D arrays). The lenslet layers 901-1, 901-2 include a structured surface 914-1, 914-2 upon which the lenslets 911, 912 reside and an unstructured surface 913-1, 913-2 that is substantially flat. The lenslets 911, 912 of layers 901-1 and 901-2 are offset with one another along the x axis as shown in FIG. 9. The layers 901-1, 901-2 are separated from one another by a gap 903. The separation between layers 901-1, 901-2 may be maintained by discrete spacers 902 forming an air gap or there may be third continuous layer that maintains the gap between the first and second layers 901-1, 901-2.

The first layer 901-1 includes a sublayer 901-1A on the structured surface 914-1 that is opaque to the polychromatic light emitted by the light source 910. Sublayer 901-1A also includes regions 905 on the lenslets that provide partial reflection at the interface of mediums 901 and 903 due to the change in refractive index at the interface. Sublayer 901-1A further includes an aperture 915 in the opaque sublayer 901-1A between the lenslets 911.

The second layer 901-2 includes a sublayer 901-1B on the unstructured surface 913-2 that is opaque to the polychromatic light emitted by the light source 910. There are openings 907 in the sublayer 901-1B that are aligned with the regions 905 of sublayer 901-1A.

The integrated chromatic confocal sensor 900-1 includes a polychromatic light source 910, e.g., an organic light emitting diode (OLED), which is formed on the unstructured surface 913-1 of layer 901-1. Lenslet pairs 911, 912 of the first and second layers 901-1, 901-2 form the imaging optics for the integrated chromatic confocal sensor 900. A WSD 930 is formed on the unstructured surface 913-1 of layer 901-1 spaced apart from the light source 910. The WSD 930 may include a split photosensor, for example, comprising two adjacent photosensors.

Polychromatic light 998 emitted from the light source 910 is transmitted through layer 901-1 along path 1*a* to the regions 905. The polychromatic light 998 is transmitted through the regions 905 and is focused by lenslet 911. The polychromatic light 998 is transmitted along path 1*b* through the gap 903 between the lenslet layers 901-1, 901-2 and toward the opening 907 in the opaque sublayer 909 on the unstructured surface 913-2 of the second layer 901-2.

Lenslet 912 focuses the light along path 1*c*. Lenslet 912 separates the polychromatic light 998 into spectral ranges 998-1, 998-2, 998-3 along the longitudinal axis 999 which corresponds to the y axis in FIG. 9. The spectral ranges 998-1, 998-2, 998-3 of light are reflected by an object under test 970 back toward the integrated confocal sensor 900-1 along path 2*a*. Lenslet 912 focuses the light toward the regions 905 along path 2*b*. The region 905 redirects the light along path 3 toward the reflective region 908 of the sublayer 901-1B. The light is reflected by the reflective region 908 toward the aperture 915 along path 4. One of the subranges 998-2 is focused at the aperture and is transmitted through the aperture 915 whereas the other subranges 998-1, 998-3 are substantially blocked. The subrange of light that is transmitted though the aperture 915 depends on the distance between lenslet 912 and the device under test 970. The subrange 998-2 that is transmitted through the aperture 915 is received by the WSD 930. The WSD 930 determines the wavelength centroid of the incoming light.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An optical device, comprising:
   an aperture structure having an aperture;
   imaging optics configured to direct polychromatic light toward the aperture and to separate the light according to spectral range longitudinally along a first axis, the aperture substantially transmitting a spectral range of the light and substantially blocking other spectral ranges of the light;
   an optical detector configured to receive the spectral range of the light that is transmitted through the aperture and to generate an electrical output that corresponds to a centroid of the spectral range of the light.

2. The device of claim 1, wherein the optical detector comprises:
   an optical filter having a laterally varying transmission characteristic with respect to wavelength along a second axis perpendicular to the first axis; and
   a photosensor configured to sense a lateral position of the spectral range of the light transmitted through the optical filter and to generate the electrical output, wherein the electrical output is responsive to the lateral position of the spectral range of the light and indicative of the centroid of the spectral range of the light.

3. The device of claim 1, further comprising a light source that emits the polychromatic light, wherein:
   the light source is configured to be attached to a first structural component;
   the imaging optics, aperture, and optical detector are attached to a second structural component in a fixed relationship; and
   the output of the optical detector varies according to distance between the first member and the second member.

4. The device of claim 1, further comprising a light source that emits the polychromatic light, wherein:
   the light source and the imaging optics are configured to be attached to a first structural component in a fixed relationship;
   the aperture, and optical detector are attached to a second structural component in a fixed relationship; and
   the output of the optical detector varies according to distance between the first structural component and the second structural component.

5. The device of claim 1, further comprising a beam splitter disposed between the aperture structure and the imaging optics, the beam splitter arranged to direct the polychromatic light toward the imaging optics, the polychromatic light passing through the imaging optics and to an object, the beam splitter arranged to direct light reflected from the object and passing through the imaging optics toward the aperture structure.

6. The device of claim 1, wherein distances between two or more of the light source, the imaging optics, and aperture structure change responsive to strain.

7. The device of claim 6, wherein a length of the imaging optics changes in response to the strain.

8. The device of claim 7, wherein the imaging optics is a graded index (GRIN) lens.

9. The device of claim 8, further comprising a light source that emits the polychromatic light, wherein the light source is optically coupled to the GRIN lens by a first light guide.

10. The device of claim 9, wherein the GRIN lens is optically coupled to the optical filter by a second light guide.

11. The device of claim 10, wherein at least one of the first and second light guides is an optical fiber.

12. The device of claim 1, further comprising a light source that emits the polychromatic light, wherein:
   the imaging optics comprises a mirror with a lens disposed thereon, the imaging optics arranged such that the polychromatic light is reflected by the mirror and toward the aperture structure; and
   the imaging optics is configured to be fixedly attached to a first member;
   the light source is configured to be fixedly attached to a second member; and
   the output of the optical detector varies according to distance between the first member and the second member.

13. The device of claim 1, wherein the device is an integrated optoelectronic device.

14. The device of claim 13, wherein the imaging optics comprises a film comprising:
   a first layer having an unstructured surface and a structured surface that includes a first array of lenslets; and
   a second layer having an unstructured surface and a structured surface that includes a second array of lenslets, the first and second layers spaced apart from each other.

15. The device of claim 14, wherein the optical detector is disposed on the film.

16. The device of claim 14, further comprising a polychromatic light source that generates the polychromatic light, the polychromatic light source disposed on the film.

17. A method, comprising:
 separating polychromatic light according into a plurality of spectral ranges longitudinally along a first axis;
 transmitting a spectral range of the light through an aperture; and
 generating an electrical output that corresponds to a centroid of the spectral range of the light.

18. The method of claim 17, further comprising measuring a distance between a first structural component and a second structural component based on the electrical output.

19. The method of claim 17, further comprising measuring vibration of a structural component based on the electrical output.

20. The method of claim 17, further comprising measuring strain based on the electrical output.

\* \* \* \* \*